(12) United States Patent  
Watanabe et al.

(10) Patent No.: US 9,247,224 B2
(45) Date of Patent: Jan. 26, 2016

(54) IMAGE PROCESSING DEVICE PERFORMING FILTERING PROCESS ON IMAGE DATA COMPONENTS USING FILTER COEFFICIENT

(71) Applicant: BROTHER KOGYO KABUSHIKI KAISHA, Nagoya-shi, Aichi-ken (JP)

(72) Inventors: Toshihiro Watanabe, Kuwana (JP); Atsushi Yokochi, Chiryu (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/284,608

(22) Filed: May 22, 2014

(65) Prior Publication Data

US 2014/0347527 A1 Nov. 27, 2014

(30) Foreign Application Priority Data

May 27, 2013 (JP) ................... 2013-110678

(51) Int. Cl.
*H04N 9/77* (2006.01)
(52) U.S. Cl.
CPC ....................... *H04N 9/77* (2013.01)
(58) Field of Classification Search
CPC ...... H04N 9/646; H04N 5/2351; G06T 5/001; G06T 2207/20172; G06T 5/002; G06T 7/403; G06T 5/003; G06T 5/004; G06T 2207/20201; G06K 9/40
See application file for complete search history.

(56) References Cited

U.S. PATENT DOCUMENTS

| | | |
|---|---|---|
| 5,850,293 A | 12/1998 | Suzuki et al. |
| 2004/0165081 A1* | 8/2004 | Shibaki et al. ............. 348/222.1 |
| 2012/0033884 A1* | 2/2012 | Ha et al. ........................ 382/168 |

FOREIGN PATENT DOCUMENTS

| | | |
|---|---|---|
| JP | 9-139843 A | 5/1997 |
| JP | 11-220618 A | 8/1999 |

* cited by examiner

*Primary Examiner* — Mekonnen Dagnew
(74) *Attorney, Agent, or Firm* — Merchant & Gould PC

(57) ABSTRACT

An image processing device includes an acquisition section, first conversion section, determination section, filtering section, and second conversion section. The acquisition section acquires first image data defined by a plurality of color components. The first conversion section converts, for each pixel data, the plurality of color components into converted pixel data defined by a luminance and a color difference. The determination section determines whether or not each converted pixel data is target pixel data having a black character attribute. The filtering section performs a filtering process on a luminance of each target pixel data using a filter coefficient to obtain processed pixel data defined by the luminance and the color difference. The filter coefficient enhances a difference in the luminance between the each target pixel data and neighboring pixel data. The second conversion section converts each processed pixel data into updated pixel data defined by the plurality of color components.

17 Claims, 8 Drawing Sheets

FIG. 4

| DETERMINA-TION RESULT | SELECTED COMPONENT OR DATA | FILTER COEFFICIENT | | |
|---|---|---|---|---|
| BLACK CHARACTER ATTRIBUTE | YIQ | Y: F1 [[-1,-3,-1,-3,-1],[-3,4,14,4,-3],[-1,14,36,14,-1],[-3,4,14,4,-3],[-1,-3,-1,-3,-1]] | I: [[0,0,0,0,0],[0,0,0,0,0],[0,0,1,0,0],[0,0,0,0,0],[0,0,0,0,0]] ← F2 → | Q: [[0,0,0,0,0],[0,0,0,0,0],[0,0,1,0,0],[0,0,0,0,0],[0,0,0,0,0]] |
| NOT BLACK CHARACTER ATTRIBUTE & EDGE PIXEL DATA | RGB | R: F3 [[-1,-3,-1,-3,-1],[-3,4,14,4,-3],[-1,14,36,14,-1],[-3,4,14,4,-3],[-1,-3,-1,-3,-1]] | G: [[-1,-3,-1,-3,-1],[-3,4,14,4,-3],[-1,14,36,14,-1],[-3,4,14,4,-3],[-1,-3,-1,-3,-1]] ← F3 → | B: [[-1,-3,-1,-3,-1],[-3,4,14,4,-3],[-1,14,36,14,-1],[-3,4,14,4,-3],[-1,-3,-1,-3,-1]] |
| NOT BLACK CHARACTER ATTRIBUTE & NOT EDGE PIXEL DATA | RGB | R: F4 [[0,0,0,0,0],[0,1,2,1,0],[0,2,4,2,0],[0,1,2,1,0],[0,0,0,0,0]] | G: [[0,0,0,0,0],[0,1,2,1,0],[0,2,4,2,0],[0,1,2,1,0],[0,0,0,0,0]] ← F4 → | B: [[0,0,0,0,0],[0,1,2,1,0],[0,2,4,2,0],[0,1,2,1,0],[0,0,0,0,0]] |

FIG. 5

DATA G

| G11 | G12 | G13 | G14 | G15 |
|-----|-----|-----|-----|-----|
| G21 | G22 | G23 | G24 | G25 |
| G31 | G32 | G33 | G34 | G35 |
| G41 | G42 | G43 | G44 | G45 |
| G51 | G52 | G53 | G54 | G55 |

FILTER COEFFICIENT

| F11 | F12 | F13 | F14 | F15 |
|-----|-----|-----|-----|-----|
| F21 | F22 | F23 | F24 | F25 |
| F31 | F32 | F33 | F34 | F35 |
| F41 | F42 | F43 | F44 | F45 |
| F51 | F52 | F53 | F54 | F55 |

$$G33 \leftarrow \left[ \frac{\sum_{i=1}^{5} \sum_{j=1}^{5} (Gij \times Fij)}{\sum_{i=1}^{5} \sum_{j=1}^{5} Fij} \right]$$

FIG. 6
IMAGE DATA ACQUIRED FROM DOCUMENT
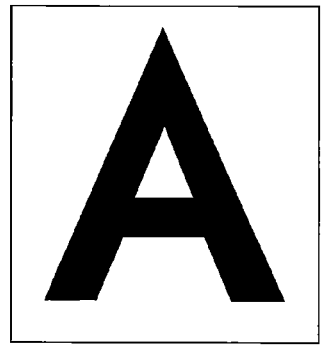
BLACK CHARACTER ATTRIBUTE
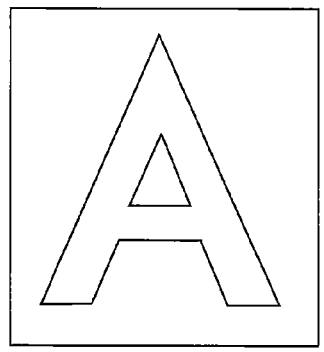
 
CONVENTIONAL TECHNOLOGY
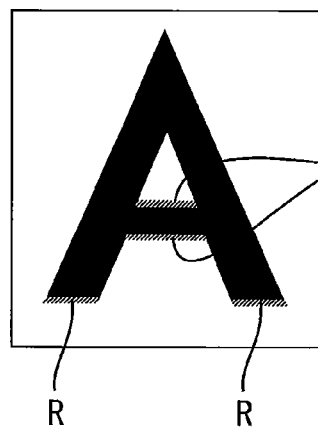
PRESENT INVENTION
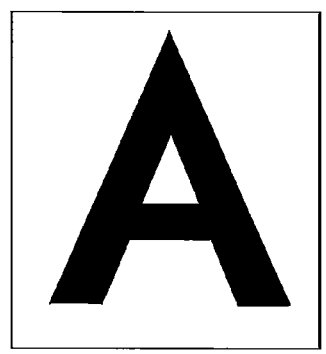

FIG. 8

| DETERMINA-TION RESULT | SELECTED COMPONENT OR DATA | FILTER COEFFICIENT | | |
|---|---|---|---|---|
| BLACK CHARACTER ATTRIBUTE | YIQ | Y (F1) | I (F2) | Q |
| NOT BLACK CHARACTER ATTRIBUTE & EDGE PIXEL DATA | RGB | R (F3) | G (F3) | B |
| NOT BLACK CHARACTER ATTRIBUTE & NOT EDGE PIXEL DATA | RGB | R (F4) | G (F4) | B |

IMAGE PROCESSING DEVICE PERFORMING FILTERING PROCESS ON IMAGE DATA COMPONENTS USING FILTER COEFFICIENT

CROSS REFERENCE TO RELATED APPLICATION

This application claims priority from Japanese Patent Application No. 2013-110678 filed May 27, 2013. The entire content of the priority application is incorporated herein by reference.

TECHNICAL FIELD

The present invention relates to an image processing device.

BACKGROUND

Conventionally, there is known a device that applies filtering processing, such as edge enhancement or smoothing, to image data (for example, Jpn. Pat. Appln. Laid-Open Publication No. 11-220618). In this conventional technology, the filtering processing is applied to all input color image signals, and it is determined whether or not the input signal is a black character signal. When the input signal is the black character signal, a filtering signal is used to output an image with a solid black color to prevent color blurring.

SUMMARY

However, in the conventional technology, even though it is determined whether or not the input signal is a black character signal, the filtering processing is applied to all image data including input signal without exception to disadvantageously generate image data that causes the color blurring, which is considered wasteful and harmful. There is desired a technology capable of reducing the color blurring while eliminating wasteful processing.

In view of the foregoing, it is an object of the invention to provide an image processing device for preventing color blurring that applies filtering processing to image data.

In order to attain the above and other objects, the invention provides an image processing device may include an acquisition section, a first conversion section, a determination section, a filtering section, and a second conversion section. The acquisition section may be configured to acquire first image data including a plurality of sets of pixel data. Each pixel data set may be defined by a plurality of color components. The first conversion section may be configured to convert, for each pixel data set, the plurality of color components into a set of converted pixel data. Each converted pixel data set may be defined by a luminance component and a color difference component. The determination section may be configured to determine whether or not each converted pixel data set has a black character attribute, converted pixel data that is determined to have the black character attribute being a set of target pixel data. The filtering section may be configured to perform a filtering process on a luminance component of each target pixel data set using a filter coefficient to obtain a set of processed pixel data. The processed pixel data set may be defined by the luminance component and the color difference component. The filter coefficient may enhance a difference in the luminance components between the each target pixel data set and a set of neighboring pixel data corresponding to the each target pixel data set. The second conversion section may be configured to convert each processed pixel data set into a set of updated pixel data. The updated pixel data set may be defined by the plurality of color components.

According to another aspect, the present invention provides a non-transitory computer readable storage medium storing a set of program instructions executed by a computer. The program instructions includes: acquiring first image data including a plurality of sets of pixel data, each pixel data set being defined by a plurality of color components; converting, for each pixel data set, the plurality of color components into a set of converted pixel data, each converted pixel data set being defined by a luminance component and a color difference component; determining whether or not each converted pixel data set has a black character attribute, converted pixel data that is determined to have the black character attribute being a set of target pixel data; performing a filtering process on a luminance component of each target pixel data set using a filter coefficient to obtain a set of processed pixel data, the processed pixel data set being defined by the luminance component and the color difference component, the filter coefficient enhancing a difference in the luminance components between the each target pixel data set and a set of neighboring pixel data corresponding to the each target pixel data set; and converting each processed pixel data set into a set of updated pixel data, the updated pixel data set being defined by the plurality of color components.

BRIEF DESCRIPTION OF THE DRAWINGS

The particular features and advantages of the invention as well as other objects will become apparent from the following description taken in connection with the accompanying drawings, in which:

FIG. 4 is an explanatory diagram showing an example of filter coefficients according to the first embodiment;

FIG. 5 is an explanatory diagram showing a filtering process executed by the image processing device according to the first embodiment;

FIG. 6 is an explanatory diagram showing effects according to the first embodiments;

FIG. 8 is an explanatory diagram showing an example of filter coefficients according to another embodiment.

DETAILED DESCRIPTION

First Embodiment

A first embodiment will be described with reference to FIGS. 1 to 6.

1. System Configuration

Figure 1:
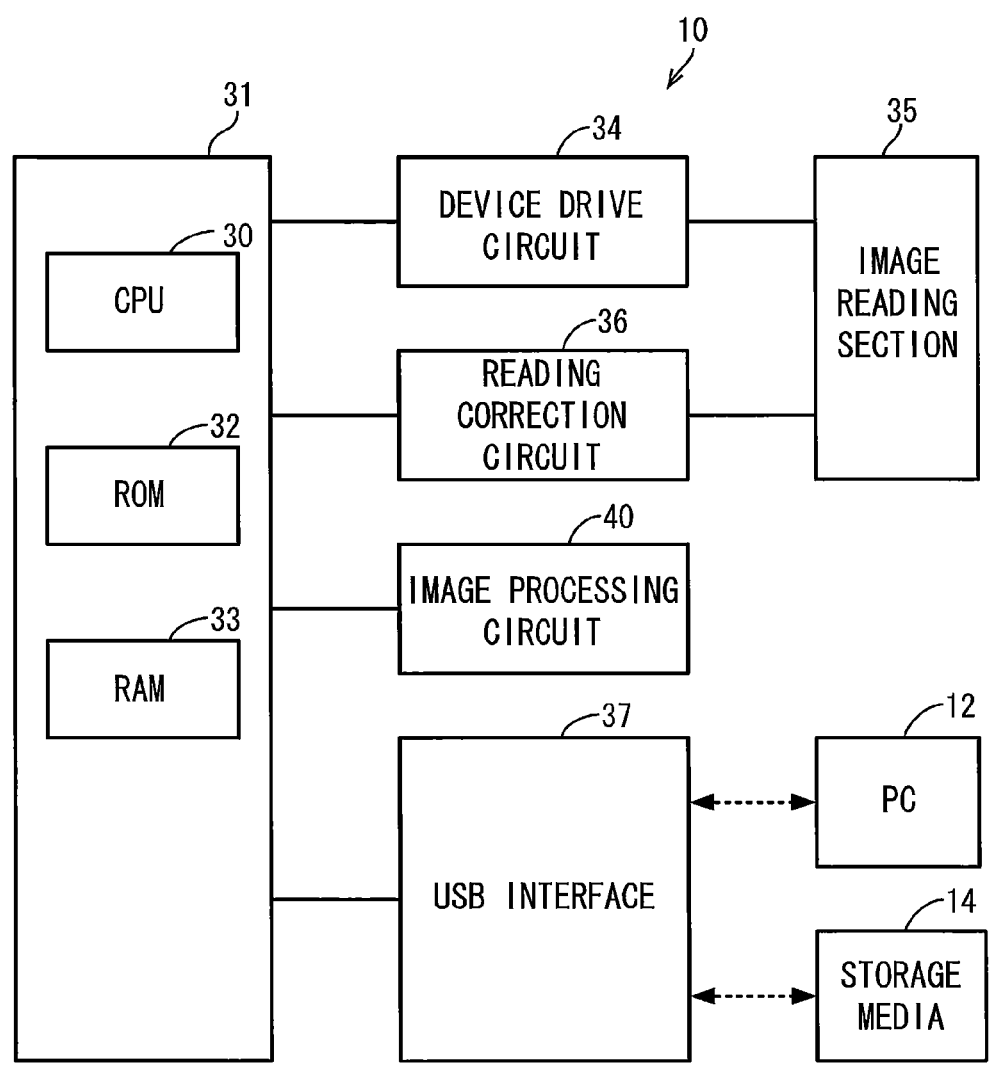
FIG. 1 is a block diagram showing an image processing device according to a first embodiment of the present invention.

As illustrated in FIG. 1, an image processing device 10 according to the first embodiment mainly includes a CPU 30, a ROM 32, a RAM 33, a device drive circuit 34, an image reading section 35, a reading correction circuit 36, an image processing circuit 40, and a USB interface 37. As denoted by a continuous line 31 in FIG. 1, a unit including the CPU 30, ROM 32, and RAM 33 serves as a controller configured to control circuits and sections in the image processing device 10.

The ROM 32 stores various programs for controlling operation of the image processing device 10, and the CPU 30 is configured to control the sections of the image processing device 10 according to a program read out from the ROM 32.

The device drive circuit 34 is connected to the image reading section 35 and is configured to transmit, to the image reading section 35, a signal for controlling reading operation in response to a command from the CPU 30. The image reading section 35 is configured to read a document based on the signal from the device drive circuit 34 and configured to output generated image data to the reading correction circuit 36.

The reading correction circuit 36 is connected to the image reading section 35 and is configured to convert the image data of an analog signal output from the image reading section 35 into image data of a digital signal. Further, the reading correction circuit 36 is configured to apply various correction processing, such as shading correction, to the image data of the digital signal. The image data that has been subjected to various correction processing is stored in the RAM 33 as image data including a plurality of sets of pixel data each having a plurality of color components: a red component (R), a green component (G), and a blue component (B). In other words, each set of pixel data is defined by the plurality of color components, R, G, and B.

The USB interface 37 is connected to various storage media 14, such as a PC 12 outside the image processing device 10 and a USB memory. The RAM 33 temporarily stores not only the image data corrected by the reading correction circuit 36 but also image data which is input thereto from outside the image processing device 10 through the USB interface 37.

The image processing circuit 40 is configured to apply filtering processing, which is a kind of image processing, to the image data stored in the RAM 33 to thereby generate processed image data. The generated processed image data is restored in the RAM 33.

2. Filtering Processing for Image Data

The following describes the filtering processing applied to the image data stored in the RAM 33 using the image processing circuit 40 with reference to FIGS. 2 to 6.

Figure 2:
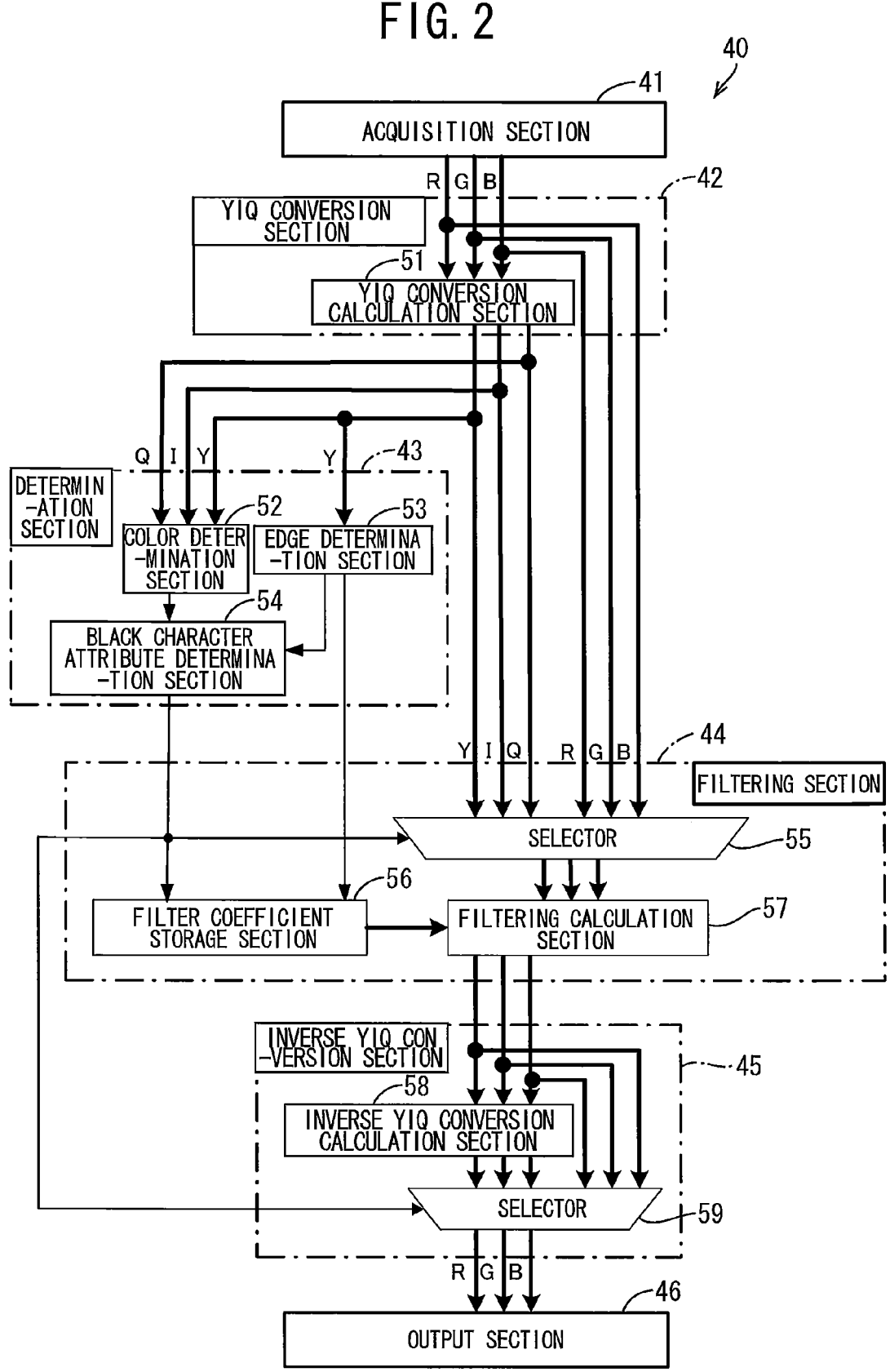
FIG. 2 is a diagram showing a configuration of an image processing circuit of the image processing device according to the first embodiment.

As illustrated in FIG. 2, the image processing circuit 40 includes an acquisition section 41, a YIQ conversion section 42, a determination section 43, a filtering section 44, an inverse YIQ conversion section 45, and an output section 46. The YIQ conversion section 42 is an example of a first conversion section, and the inverse YIQ conversion section 45 is an example of a second conversion section.

When image data is stored in the RAM 33, the CPU 30 inputs, to the acquisition section 41, information indicating that the image data is stored in the RAM 33. The acquisition section 41 receives an input of the information from the CPU 30 and starts acquiring the image data from the RAM 33. Every time the acquisition section 41 acquires each set of pixel data included in the image data, the acquisition section 41 outputs the acquired pixel data to the YIQ conversion section 42.

The YIQ conversion section 42 has a YIQ conversion calculation section 51 configured to convert each set of pixel data inputted from the acquisition section 41 into a luminance component (Y) and two color difference components (I, Q). The pixel data set has a plurality of color components R, G, and B. The YIQ conversion section 42 outputs, for each set of pixel data, the luminance component and color difference components obtained as a result of the conversion made by the YIQ conversion calculation section 51 to the determination section 43 as well as to the filtering section 44. Further, the YIQ conversion section 42 outputs each set of pixel data having the plurality of color components before conversion made by the YIQ conversion calculation section 51 to the filtering section 44.

The determination section 43 includes a color determination section 52, an edge determination section 53, and a black character attribute determination section 54 and uses the luminance component and color difference components inputted from the YIQ conversion section 42 to determine whether or not each pixel data has a black character attribute to be described later.

Figure 3:
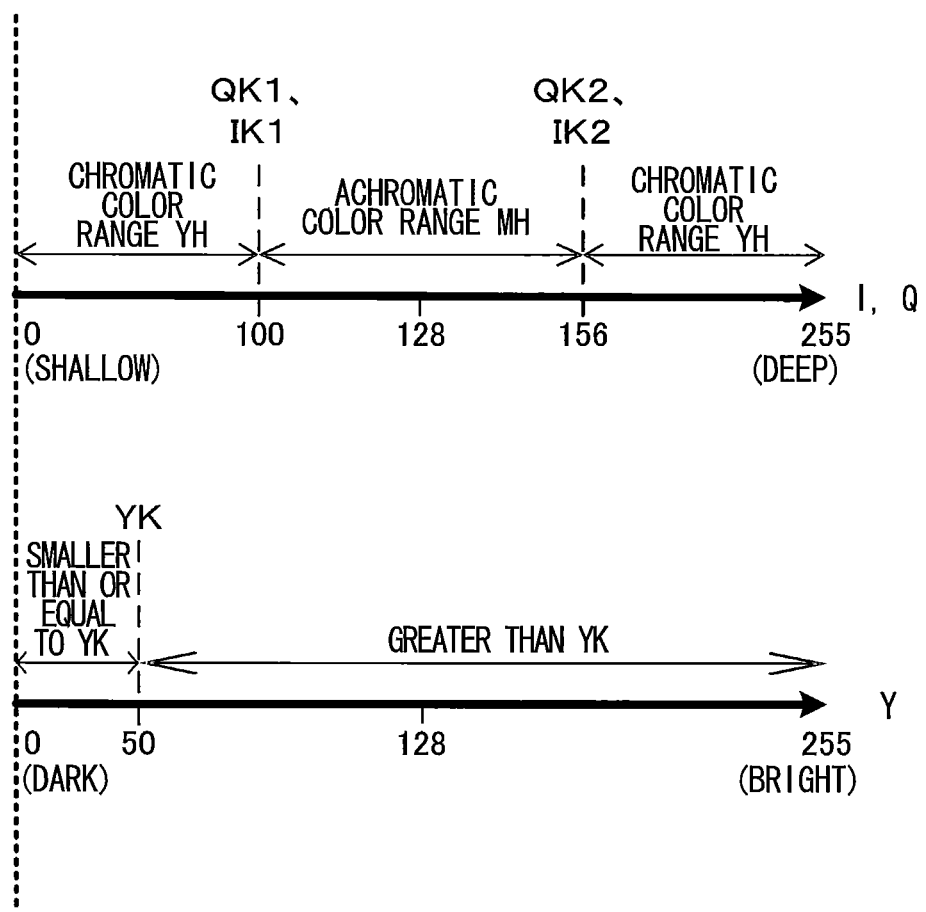
FIG. 3 is an explanatory diagram illustrating a reference value of luminance components, and an achromatic range and a chromatic range of color difference components.

The color determination section 52 determines, for each set of pixel data, whether each color difference component falls within an achromatic color range MH or within a chromatic color range YH. As shown in FIG. 3, the color determination section 52 stores first reference value IK1 and QK1 and second reference values IK2 and QK2. The first reference value IK1 and the second reference value IK2 are stored for the I color component. The first reference value QK1 and the second reference value QK2 are stored for the Q color component. Based on the reference values IK and IQ, the achromatic color range MH and chromatic color range YH are set for each color component. Specifically, in each color difference component, a range equal to or larger than the first reference value IK1 (QK1) and equal to or smaller than the second reference value IK2 (QK2) is set as the achromatic color range MH, and the remaining range is set as the chromatic color range YH.

The color determination section 52 compares a value of each color difference component included in the pixel data with its corresponding reference values IK or QK. When both color difference components fall within the respective achromatic color range MH, the color determination section determines that the color difference components of the pixel data falls within the achromatic color range MH. When at least one color difference component is included in the chromatic color range YH, it is determined that the color difference component of the pixel data is in the chromatic color range YH.

Further, the color determination section 52 determines, for each set of pixel data, whether or not the luminance component has a value smaller than or equal to a reference value YK stored in the color determination section 52. A larger value of the luminance component represents a brighter color, and a smaller value thereof represents a darker color. The color determination section 52 compares the value of the luminance component of the pixel data with the reference value YK to determine whether or not the value is smaller than or equal to the reference value YK, that is, whether the color of the pixel data is darker than a color represented by the reference value YK.

Then, when the color difference component of the pixel data falls within the achromatic color range MH and the luminance component of the pixel data is smaller than or equal to the reference value YK, the color determination section 52 determines that color information of the pixel data indicates black. On the other hand, when the color difference component of the pixel data falls within the chromatic color range YH or when the value of the luminance component of the pixel data is larger than the reference value YK, the color determination section 52 determines that color information of the pixel data does not indicate black. The color determination section 52 determines, for each set of pixel data, whether or not the color information indicates black and outputs a result of the determination to the black character attribute determination section 54. The pixel data determined to indicate black serves as an example of second pixel data.

The edge determination section 53 performs edge pixel detection processing for each pixel data to determine whether or not each set of pixel data is edge pixel data. As an edge pixel detection method, various known edge detection methods can be used. In the first embodiment, the edge determination section 53 stores a filter coefficient and a prescribed value of a difference filter. The edge determination section 53 uses the filter coefficient to perform calculation for the luminance component of target pixel data and luminance component of neighboring pixel data around the target pixel. And then, the edge determination section 53 calculates a calculation result representing a difference between the luminance components of the target pixel data and neighboring pixel data.

The larger the value of the calculation result is, the larger the difference between the luminance components of the target pixel data and neighboring pixel data becomes. The smaller the value of the calculation result is, the smaller the difference between the luminance components of the target pixel data and neighboring pixel data becomes. The edge determination section 53 compares the calculated result with the prescribed value. When the calculation result is equal to or larger than the prescribed value, the edge determination section 53 determines that the target pixel data is the edge pixel data. On the other hand, when the calculation result is smaller than the prescribed value, the edge determination section 53 determines that the target pixel data is not the edge pixel data. The edge pixel data serves as an example of first pixel data and means pixel data whose calculation result is greater than the prescribed value. The edge determination section 53 outputs the determination result to the black character attribute determination section 54 and a filter coefficient storage section 56 of the filtering section 44.

The neighboring pixel data refers to pixel data corresponding to a neighboring pixel positioned around a target pixel corresponding to the target pixel data of the image data when an image is displayed on a display section such as a liquid crystal display on the basis of the image data. A plurality of display elements are arranged in one or two dimensional manner on the display section. Each set of pixel data is input to the each display element of the display section (not shown) when the image is displayed on the display section. The neighboring pixel data refers to pixel data to be input to a neighboring display element around a display element to which a target pixel data is input. More in detail, each set of pixel data included in the image data includes, in addition to the information representing the plurality of color components, information representing positional relationships between pixel data. Each section included in the image processing circuit 40 can determine whether or not pixel data is neighboring pixel data of the target pixel data on the basis of the positional information.

The black character attribute determination section 54 uses the determination results inputted from the color determination section 52 and edge determination section 53 to determine whether or not each set of pixel data has the black character attribute. The pixel data (YIQ pixel data) that is determined to have the black character attribute serves an example of target pixel data. The black character attribute determination section 54 determines, as pixel data having the black character attribute, pixel data that has been determined by the color determination section 52 to have the color information representing black and that has been determined by the edge determination section 53 to be the edge pixel. That is, the pixel data having the black character attribute refers to pixel data corresponding to edge pixel (detected pixel) having the color information representing black. On the other hand, black character attribute determination section 54 determines, pixel data failing to have the black character attribute, pixel data that has been determined by the color determination section 52 not to have the color information representing black or that has been determined by the edge determination section 53 not to be the edge pixel. The black character attribute determination section 54 outputs a result of the determination to a selector 55 of the filtering section 44, filter coefficient storage section 56, and a selector 59 of the inverse YIQ conversion section 45.

The filtering section 44 includes a selector 55, a filter coefficient storage section 56, and a filtering calculation section 57 and selects, for each set of pixel data, a combination of the luminance and color difference components or pixel data having a plurality of color components (RGB) inputted from the YIQ conversion section 42 and performs filtering processing for the selected one. The filter coefficient storage section 56 is an example of a storage section.

The selector 55 selects, for each set of pixel data, one of: a combination of the luminance and color difference components; and the pixel data set having the plurality of color components inputted from the YIQ conversion section 42, on the basis of the determination result inputted from the black character attribute determination section 54. Specifically, the selector 55 selects the combination of the luminance and color difference components (YIQ) for the pixel data that has been determined by the black character attribute determination section 54 to have the black character attribute. On the other hand, the selector 55 selects pixel data having a plurality of color components (RGB) for the pixel data that has been determined by the black character attribute determination section 54 not to have the black character attribute. The selector 55 outputs the selected components or data to the filtering calculation section 57.

The filter coefficient storage section 56 stores a plurality of filter coefficients F including first to fourth of filter coefficients F1 to F4 illustrated in FIG. 4. Each filter coefficient F is a 5×5 (five rows and five columns) matrix and has 25 values set therein. The filter coefficients F are each configured such that the value increases from a peripheral row or column (first or fifth row, or first or fifth column) toward a center (element in the third row and third column).

In the first embodiment, the first filter coefficient F1 and third filter coefficient F3 have the same values and include negative values as their peripheral elements. On the other hand, the second filter coefficient F2 and fourth filter coefficient F4 include a zero value as their peripheral elements, not the negative values. The negative value is an example of an enhancement coefficient.

The filter coefficient storage section 56 selects, for each color component of each set of pixel data, the filter coefficient F (one of the first to fourth filter coefficient F1 to F4) on the basis of the determination results inputted from the edge determination section 53 and black character attribute determination section 54. Specifically, the filter coefficient storage section 56 selects the first filter coefficient F1 for the luminance component of the pixel data that has been determined by the black character attribute determination section 54 to have the black character attribute, while selects the second filter coefficient F2 for the color difference components of the pixel data that has been determined to have the black character attribute. Further, the filter coefficient storage section 56 selects the third filter coefficient F3 for each color component of the pixel data that has been determined by black character attribute determination section 54 not to have the black character attribute and that has been determined by the edge determination section 53 to be the edge pixel data. Further, the filter coefficient storage section 56 selects the fourth filter coefficient F4 for each color component of the pixel data that has been determined by black character attribute determination section 54 not to have the black character attribute and that has been determined by the edge determination section 53 not to be the edge pixel data. The filter coefficient storage section 56 outputs the selected filter coefficient F to the filtering calculation section 57.

The filtering calculation section 57 performs filtering processing on the component or data inputted from the selector 55 using the filter coefficient selected by the filter coefficient storage section 56. As illustrated in FIG. 5, in the filtering processing, the filtering calculation section 57 waits for input of 5×5 data group G including target pixel data set at a center thereof and its neighboring pixel data sets. Upon input of the data group G, the filtering calculation section 57 calculates a matrix product of the selected filter coefficient F and data group G as represented by expression 1 of FIG. 5. The filtering calculation section 57 divides the calculated matrix product by a sum of the values included in the selected filter coefficient F to calculate processed components or data.

With respect to the pixel data that has been determined by the black character attribute determination section 54 to have the black character attribute, the filtering calculation section 57 performs the filtering processing for the luminance component inputted from the selector 55 using the first filter coefficient F1 inputted from the filter coefficient storage section 56 and performs the filtering processing for the color difference components inputted from the selector 55 using the second filter coefficient F2 inputted from the filter coefficient storage section 56.

The filter coefficient F1 includes the negative values as their peripheral elements. When the matrix product of the first filter coefficient F1 and data group G is calculated for the target pixel data, a result of the calculation is positive. On the other hand, the calculation results obtained using the neighboring pixel data sets are negative values. As a result, in the calculated matrix product, a difference between the luminance components of the target pixel data and the neighboring pixel data is enhanced, and the enhanced result is reflected on the processed luminance component. That is, the first filter coefficient F1 can be considered to be a filter coefficient F that enhance a difference between the target pixel data and its neighboring pixel data.

On the other hand, the second filter coefficient F2 includes a zero value as their peripheral elements, not the negative values, so that, when the matrix product of the second filter coefficient F2 and data group G is calculated for the neighboring pixel data, results of the calculation is zero. Thus, in the calculated matrix product, the difference between the target pixel data and its neighboring pixel data is not enhanced as compared to a case where the first filter coefficient F1 is used. That is, the second filter coefficient F2 can be considered to be a filter coefficient F that do not enhance the difference between the target pixel data and its neighboring pixel data. In other words, the first filter coefficient F2 excludes any enhancement coefficient values whose degrees of enhancements are greater than or equal to a degree of enhancement of the enhancement coefficient (negative value in the embodiment) of the first filter coefficient F1.

Further, the filtering calculation section 57 performs, using the third filter coefficient F3 inputted from the filter coefficient storage section 56, the filtering processing for each color component of the pixel data that has been determined by the black character attribute determination section 54 not to have the black character attribute and that has been determined by the edge determination section 53 to be the edge pixel data. Like the first filter coefficient F1, the third filter coefficient F3 includes the negative values as their peripheral elements, so that in a result of the calculation for the target pixel, a difference between each color component of the target pixel data and that of the neighboring pixel data is enhanced. The calculation results using the first filter coefficient F1-F4 serves as an example of processed pixel data.

Further, the filtering calculation section 57 performs, using the fourth filter coefficient F4 inputted from the filter coefficient storage section 56, the filtering processing for each color component of the pixel data that has been determined by the black character attribute determination section 54 not to have the black character attribute and that has been determined by the edge determination section 53 not to be the edge pixel data. Like the second filter coefficient F2, the fourth filter coefficient F4 include a zero value as their peripheral elements, not the negative values, so that, in a result of the calculation for the target pixel, a difference between each color component of the target pixel data and that of the neighboring pixel data is not enhanced. In other words, the first filter coefficient F4 excludes any enhancement coefficient values whose degrees of enhancements are greater than or equal to a degree of enhancement of the enhancement coefficient (negative value in the embodiment) of the third filter coefficient F3. The filtering calculation section 57 outputs the processed components or processed data of each set of pixel data to the inverse YIQ conversion section 45.

The inverse YIQ conversion section 45 includes an inverse YIQ conversion calculation section 58 and a selector 59. When receiving as an input the processed luminance component and color difference components from the filtering section 44, the inverse YIQ conversion calculation section 58 converts, for each set of pixel data (YIQ pixel data in the first embodiment), the processed luminance component and color difference components into a plurality of color components (RGB pixel data in the first embodiment). This RGB pixel data serves as an example of the update d pixel data. The inverse YIQ conversion calculation section 58 outputs a plurality of the processed color components after the conversion made by itself to the selector 59. On the other hand, when a plurality of the processed color components are inputted from the filtering section 44, the plurality of the processed color components are directly input to the selector 59.

The selector 59 selects, for each set of pixel data, the plurality of processed color components after the conversion made by the inverse YIQ conversion calculation section 58 or a plurality of processed color components after the filtering processing made by the filtering section 44 based on the determination result inputted from the black character attribute determination section 54. Specifically, the selector 59 selects the plurality of processed color components after the conversion made by the inverse YIQ conversion calculation section 58 for the pixel data that has been determined by the black character attribute determination section 54 to have the black character attribute. The selector 59 selects the plurality of processed color components after the filtering processing made by the filtering section 44 for the pixel data that has been determined not have the black character attribute. The selector 55 outputs the selected plurality of processed color components to the output section 46.

The output section 46 outputs, every time the output section 46 acquires each set of pixel data having the plurality of processed color components from the inverse YIQ conversion section 45, the acquired pixel data to the RAM 33. Thus, in the RAM 13, processed image data composed of the plurality of sets of pixel data each having the plurality of processed color components is stored. The processed image data serves as an example of second image data.

3. Effects of First Embodiment (1) In the image processing device 10 according to the first embodiment, it is determined whether or not each set of pixel data of the image data has the black character attribute before the filtering processing to be performed for the image data using the image processing circuit 40. For example, in a case of image data in which a black character "A" is written on a white base part as illustrated at a topmost stage of FIG. 6, an outline of the black character is determined to have the black character attribute as illustrated at a middle stage of FIG. 6.

The pixel data (target pixel data) that has been determined to have the black character attribute can be regarded as the pixel data corresponding to the edge pixel, so that filtering processing that enhances the difference between the luminance components of the target pixel data and its neighboring pixel data is performed for the target pixel data. In the conventional technology, the filtering processing is performed for the pixel data that has been determined to have the black character attribute without distinction between the luminance component and color difference components. In such a case, not only the difference between the luminance components of the target pixel data and its neighboring pixel data, but also a difference between the color difference components of the target pixel data and its neighboring pixel data is enhanced. This disadvantageously remarkably enhances a specific color component included in the plurality of color components of the pixel data, as illustrated at a left side of a lowermost stage of FIG. 6. As a result, when processed image data is displayed on the display section (not shown), a color component that is not visible on the image data disadvantageously appear at a region R which is a part of the outline of the black character, as illustrated in an exaggerated manner at the left side of the lowermost stage of FIG. 6. That is, so-called color blurring occurs.

In the image processor 10 according to the first embodiment, when the target pixel data has been determined to have the black character attribute, the filter processing is performed for the luminance component obtained by converting the pixel data, using the filter coefficient F that enhance the difference between the target pixel data and its neighboring pixel data. This allows the difference between the luminance components of the edge pixel data and its neighboring pixel data to be enhanced.

On the other hand, the filtering processing is performed for the color difference components obtained by converting the pixel data (target pixel data) that has been determined to have the black character attribute, using the filter coefficient F that do not enhance the difference between the target pixel data and its neighboring pixel data. This prevents the difference between the target pixel data and its neighboring pixel data from being enhanced in all the plurality of color components of the pixel data that has been determined to have the black character attribute. As a result, it is possible to prevent a specific color component from being remarkably enhanced at the outline of the black character, thereby preventing occurrence of the color blurring as illustrated at a right of the third stage of FIG. 6.

(2) In the image processing device 10 according to the first embodiment, the above-described processing: the filtering processing for the luminance component and color difference components obtained by converting the pixel data; and changeover of the filter coefficient to be used in the filtering processing for the luminance component and color difference components are performed with respect only to the pixel data that has been determined to have the black character attribute, while the filtering processing for each color component of the pixel data is performed with respect to the pixel data that has been determined not to have the black character attribute. Thus, the filtering processing can be performed based on attribute of each set of pixel data included in the image data, whereby it is possible to eliminate wasteful operation involving the filtering processing as compared to the conventional technology in which all the pixel data included in the image data are subjected to the filtering processing and then the pixel data that has been determined to have the black character attribute is subjected to additional processing.

(3) In the image processing device 10 according to the first embodiment, whether or not the pixel data has the black character attribute is determined using the reference values YK, IK, and QK previously stored in the image processing circuit 40. Thus, as illustrated at the middle stage of FIG. 6, it is possible to determine, as the pixel data having the black character attribute, not only the black character, but also the outline of a solid pattern satisfying specific conditions defined by the reference values YK, IK, and QK.

(4) In the image processing device 10 according to the first embodiment, when the target pixel data has been determined not to have the black character attribute, it is then determined whether the target pixel that has been determined not to have the black character attribute is the edge pixel data. Then, when the target pixel data is determined to be the edge pixel data and not to have the black character attribute, the filtering processing is performed for each color component of the target pixel data using the third filter coefficient F3 that enhance the difference between the target pixel data and its neighboring pixel data. This can enhance the difference between the each color component of the pixel data and that of its neighboring pixel data with respect also to the edge pixel data which has not been determined to have the black character attribute.

Further, in the image processing device 10 according to the first embodiment, when the target pixel data has been determined not to have the black character attribute and has been determined not to be the edge pixel data, the filtering processing is performed for each color component of the target pixel data using the fourth filter coefficient F4 that do not enhance the difference between the target pixel data and its neighboring pixel data. This does not enhance, but can smooth the difference between the each color component of the pixel data and that of its neighboring pixel data with respect to the pixel data that has been determined not to be the edge pixel data.

Second Embodiment

Figure 7:
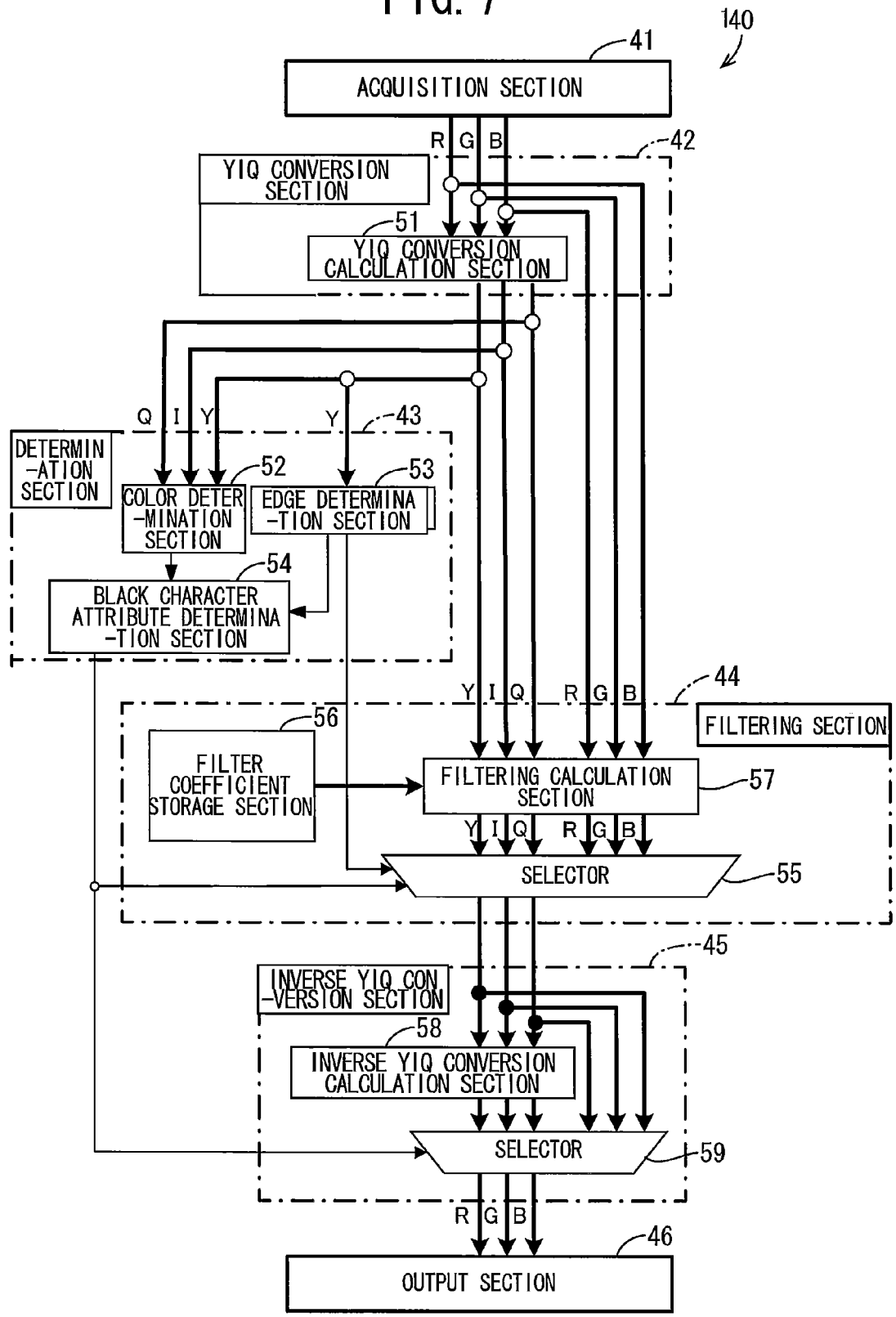
FIG. 7 is a diagram showing a configuration of an image processing circuit of an image processing device according to a second embodiment of the present invention.

The following describes a second embodiment with reference to FIG. 7. In the second embodiment, the filtering section 44 of an image processing circuit 140 performs the filtering processing both for the combination of the luminance component and color difference components of each set of pixel data and pixel data set having the plurality of color components which are inputted from the YIQ conversion section 42. The second embodiment differs in this point from the first embodiment in which the filtering processing is performed for the combination of the luminance component and color difference components of each set of pixel data or pixel data set having the plurality of color components. Hereinafter, descriptions of the same contents as those of the first embodiment are omitted for avoiding redundant.

1. Filtering Processing for Image Data

As illustrated in FIG. 7, the image processing circuit 140 according to the second embodiment differs from the image processing circuit 40 according to the first embodiment illustrated in FIG. 2 in the processing performed by the determination section 43 and filtering section 44.

In the determination section 43, the edge determination section 53 determines whether or not each set of pixel data is the edge pixel data and outputs a result of the determination to the black character attribute determination section 54 and selector 55 of the filtering section 44, but does not output the determination result to the filter coefficient storage section 56 of the filtering section 44. The black character attribute determination section 54 determines whether or not each set of pixel data has the black character attribute and outputs a result of the determination to the selector 55 of the filtering section 44 and selector 59 of the inverse YIQ conversion section 45, but does not output the determination result to the filter coefficient storage section 56 of the filtering section 44.

In the filtering section 44, the filter coefficient storage section 56 outputs the first to fourth filter coefficients F1 to F4 to the filtering calculation section 57 every time the components and data of each set of pixel data are inputted from the YIQ conversion section 42 to the filtering calculation section 57.

The filtering calculation section 57 performs the filtering processing for both the components and data of each set of pixel data using the filter coefficient F inputted from the filter coefficient storage section 56. That is, the filtering calculation section 57 performs the filtering processing on the components and data of each set of pixel data irrespective of the determination result from the determination section 43. Specifically, the filtering calculation section 57 performs the filtering processing on the luminance component of each set of pixel data inputted from the YIQ conversion section 42 using the first filter coefficient F1 inputted from the filter coefficient storage section 56 and performs the filter processing on the color difference components inputted from the YIQ conversion section 42 using the second filter coefficient F2 inputted from the filter coefficient storage section 56.

Further, the filtering calculation section 57 performs the filtering processing on the color components of each set of pixel data inputted from the YIQ conversion section 42 using the third filter coefficient F3 inputted from the filter coefficient storage section 56. Further, the filtering calculation section 57 performs the filtering processing on the color components of each pixel data inputted from the YIQ conversion section 42 using the fourth filter coefficient F4 inputted from the filter coefficient storage section 56. The filtering calculation section 57 outputs the processed components and processed data of each pixel data to the selector 55.

The selector 55 selects, for each set of pixel data, the combination of the processed luminance and processed color difference components or pixel data having the plurality of processed color components inputted from the filtering calculation section 57 on the basis of the determination results inputted from the black character attribute determination section 54 and edge determination section 53. In order for the selector 55 to perform the above selection, the filtering calculation section 57 performs the filtering processing in advance of input of the determination results from the determination section 43 and outputs a result of the filtering processing, i.e., processed components and processed data to the selector 55.

Specifically, the selector 55 selects the processed luminance component and processed color difference components for the pixel data that has been determined by the black character attribute determination section 54 to have the black character attribute. Further, the selector 55 selects the pixel data having the plurality of processed color components obtained as a result of the filtering processing using the third filter coefficient F3 for the pixel data that has been determined by the black character attribute determination section 54 not to have the black character attribute and that has been determined by the edge determination section 53 to be the edge pixel data. Further, the selector 55 selects the pixel data having the plurality of processed color components obtained as a result of the filtering processing using the fourth filter coefficient F4 for the pixel data that has been determined by the black character attribute determination section 54 not to have the black character attribute and that has been determined by the edge determination section 53 not to be the edge pixel data. The selector 55 outputs, for each pixel data, the selected processed components or processed data to the inverse YIQ conversion calculation section 58.

As a result, in the pixel data that has been determined by the black character attribute determination section 54 to have the black character attribute, the processed luminance component and processed color difference components are converted into the plurality of color components by the inverse YIQ conversion calculation section 58, and the obtained plurality of processed color components are output to the RAM 33 through the selector 59 and output section 46.

Further, in the pixel data that has been determined by the black character attribute determination section 54 not to have the black character attribute and that has been determined by the edge determination section 53 to be the edge pixel data, the plurality of processed color components obtained as a result of the filtering processing that the filtering calculation section 57 performs using the third filter coefficient F3 are output to the RAM 33 through the selector 59 and output section 46.

Further, in the pixel data that has been determined by the black character attribute determination section 54 not to have the black character attribute and that has been determined by the edge determination section 53 not to be the edge pixel data, the plurality of processed color components obtained as a result of the filtering processing that the filtering calculation section 57 performs using the fourth filter coefficient F4 are output to the RAM 33 through the selector 59 and output section 46. The RAM 33 stores processed image data composed of plurality of pixel data having the plurality of processed color components.

2. Effects of Second Embodiment (1) In the image processor 10 according to the second embodiment, when the image processing circuit 40 is used to perform the filtering processing on the image data, the filtering section 44 performs the filtering processing in advance of input of the determination results thereto from the determination section 43 and does not perform the filtering processing after the input of the determination results. This makes it possible to utilize a time until the determination results for each set of pixel data are outputted from the determination section 43 for execution of the filtering processing, thereby reducing a time required to perform the filtering processing for the image data.

(2) However, in the image processor 10 according to the second embodiment, a plurality of kinds of the filtering processing are performed for each image data, so that it can be said that waste processing is generated. However, by utilizing the time until the determination results for each set of pixel data are outputted, which is not utilized in the conventional approach, it is possible to reduce a time required to perform the filtering processing for the image data even when the waste processing is generated.

Other Embodiments

The present invention is not limited to the embodiments described in the detailed descriptions and drawings, and the following various embodiments are included in the technical scope of the present invention.

(1) In the first and second embodiments, the image processor 10 having a scanner function is exemplified. However, the present invention is not limited to this. For example, the image processor 10 may be a device provided with at least one of a printer function, a scanner function, a copy function, and a facsimile function.

(2) Alternatively, it is possible to use, as the image processor 10, a device that does not have the above functions at all. For example, the image processor 10 may be a device specialized to perform image processing that applies filtering processing to image data which is externally input through the USB interface 37.

(3) In the first and second embodiments, the pixel data having the plurality of color components are converted into the color difference components of I component and Q component. However, the present invention is not limited to this. It is possible to use any color difference components, such as Cb and Cr components or Pb and Pr components, that are converted separately from the luminance component.

(4) In the first and second embodiment, with regard to the filter coefficient F stored in the filter coefficient storage section 56, the first and third filter coefficients F1 and F3 are equal to each other, and first, second, and fourth filter coefficients F1, F2, and F4 are different from each other. However, the present invention is not limited to this. For example, all the first to fourth filter coefficients F1 to F4 may be different from each other.

Further, as illustrated in FIG. 8, a configuration may be possible, in which the first and third filter coefficients F1 and F3 are equal to each other, and second and fourth filter coefficients F2 and F4 are equal to each other. This configuration can reduce the number of the filter coefficients F to be stored in the filter coefficient storage section 56, thereby suppressing a capacity required for the filter coefficient storage section 56.

(5) In the first and second embodiments, the second and fourth filter coefficients F2 and F4 include no negative value. However, the present invention is not limited to this, and the second and fourth filter coefficients F2 and F4 each may include a negative value.

In this case, if the sum of the values included in the first filter coefficient F1 are equal to the sum of the values included in the second filter coefficient F2, an absolute value of each negative value included in the second filter coefficient F2 is preferably set smaller than an absolute value of each negative value included in the first filter coefficient F1. This allows the second filter coefficient F2 to be a filter coefficients F that do not enhance the difference between the target pixel data and its neighboring pixel data as much as the first filter coefficient F1, as in the first and second embodiments.

Similarly, if the sum of the values included in the third filter coefficient F3 are equal to the sum of the values included in the fourth filter coefficient F4, an absolute value of each negative value included in the fourth filter coefficients F4 is preferably set smaller than an absolute value of each negative value included in the third filter coefficient F3. This allows the fourth filter coefficient F4 to be a filter coefficients F that do not enhance the difference between the target pixel data and its neighboring pixel data as much as the third filter coefficient F3, as in the above embodiments.

What is claimed is:

1. An image processing device comprising:
    an acquisition section configured to acquire first image data including a plurality of sets of pixel data, each pixel data set being defined by a plurality of color components;
    a first conversion section configured to convert, for each pixel data set, the plurality of color components into a set of converted pixel data, each converted pixel data set being defined by a luminance component and a color difference component;
    a determination section configured to determine whether or not each converted pixel data set has a black character attribute, each converted pixel data set that is determined to have the black character attribute being a set of target pixel data;
    a filtering section configured to perform a filtering process on a luminance component of each target pixel data set using a first group of filter coefficients and perform the filtering process on the color difference component of the each target pixel data set using a second group of filter coefficients to obtain a set of processed pixel data, the processed pixel data set being defined by the luminance component and the color difference component, the first group of filter coefficients including an enhancement coefficient enhancing a difference in the luminance components between the each target pixel data set and a set of neighboring pixel data corresponding to the each target pixel data set, the second group of filter coefficients excluding any enhancement coefficients whose degrees of enhancements are greater than or equal to a degree of enhancement of the enhancement coefficient included in the first group of filter coefficients; and
    a second conversion section configured to convert each processed pixel data set into a set of updated pixel data, the updated pixel data set being defined by the plurality of color components.

2. The image processing device according to claim 1, further comprising:
    a first-pixel determination section configured to determine whether or not each converted pixel data set is first pixel data, the first pixel data satisfying that a difference in the luminance components between the each converted pixel data set and a set of neighboring pixel data corresponding to the each converted pixel data set is greater than a predetermined value; and
    a second-pixel determination section configured to determine whether or not each converted pixel data set is second pixel data, the second pixel data representing black and satisfying: that the color difference component of the each converted pixel data set falls within an achromatic color range; and that the luminance component of the each converted pixel data set is smaller than or equal to a reference value;
    wherein the determination section is configured to determine that each converted pixel data set determined as both the first pixel data and the second pixel data has the black character attribute.

3. The image processing device according to claim 2, further comprising a storage section storing the first group of filter coefficients and the second group of filter coefficients.

4. The image processing device according to claim 1, wherein the determination section is configured to determine that each converted pixel data set that is determined not to be the first pixel data or that is determined not to be the second pixel data does not have the black character attribute;
    wherein the filtering section is further configured to perform, using a third group of filter coefficients, the filtering process on each of the plurality of color components of a set of pixel data to obtain first filtered pixel data, the set of pixel data being included in the first image and corresponding to each converted pixel data set that is determined not to have the black character attribute and that is determined as the first pixel data, the third group of filter coefficient including an enhancement coefficient;

wherein the filtering section is further configured to perform, using a fourth group of filter coefficients, the filtering process on the plurality of color components of a set of pixel data to obtain second filtered pixel data, the set of pixel data being included in the first image and corresponding to each converted pixel data set that is determined not to have the black character attribute and that is not determined as the first pixel data, the fourth group of filter coefficients excluding any enhancement coefficients whose degrees of enhancements are greater than or equal to a degree of enhancement of the enhancement coefficient included in the third group of filter coefficients.

5. The image processing device according to claim 4, further comprising an output section configured to output second image data, the second image data including a plurality of sets of output pixel data corresponding to the plurality of sets of pixel data of the first image data, respectively, the output section being configured to output the second image data in a manner that:

when the determination section determines that a set of converted pixel data has the black character attribute, the output section outputs, as a set of output pixel data, the updated pixel data set corresponding to the set of converted pixel data;

when the determination section determines that a set of converted pixel data does not have the black character attribute and is the first pixel data, the output section outputs, as a set of output pixel data, the first filtered pixel data corresponding to the set of converted pixel data; and when the determination section determines that a set of converted pixel data does not have the black character attribute and is not the first pixel data, the output section outputs, as a set of output pixel data, the second filtered pixel data corresponding to the set of converted pixel data.

6. The image processing device according to claim 4, wherein the first group of filter coefficients is the same as the third group of filter coefficients;

wherein the second group of filter coefficients is the same as the fourth group of filter coefficients.

7. The image processing device according to claim 5, wherein the first group of filter coefficients is the same as the third group of filter coefficients;

wherein the second group of filter coefficients is the same as the fourth group of filter coefficients.

8. The image processing device according to claim 1, wherein the first conversion section is configured to convert, for each pixel data set, the plurality of color components into a set of YIQ color data, the set of YIQ color data including: a Y component representing luminance; and I and Q components representing color differences.

9. A non-transitory computer readable storage medium storing a set of program instructions executed by a computer, the program instructions comprising:

acquiring first image data including a plurality of sets of pixel data, each pixel data set being defined by a plurality of color components;

converting, for each pixel data set, the plurality of color components into a set of converted pixel data, each converted pixel data set being defined by a luminance component and a color difference component;

determining whether or not each converted pixel data set has a black character attribute, each converted pixel data set that is determined to have the black character attribute being a set of target pixel data;

performing a filtering process on a luminance component of each target pixel data set using a first group of filter coefficients and performing the filtering process on the color difference component of the each target pixel data set using a second group of filter coefficients to obtain a set of processed pixel data, the processed pixel data set being defined by the luminance component and the color difference component, the first group of filter coefficients including an enhancement coefficient enhancing a difference in the luminance components between the each target pixel data set and a set of neighboring pixel data corresponding to the each target pixel data set, the second group of filter coefficients excluding any enhancement coefficients whose degrees of enhancements are greater than or equal to a degree of enhancement of the enhancement coefficient included in the first group of filter coefficients; and converting each processed pixel data set into a set of updated pixel data, the updated pixel data set being defined by the plurality of color components.

10. An image processing device comprising:

an image processing circuit configured to:

acquire first image data including a plurality of sets of pixel data, each pixel data set being defined by a plurality of color components;

convert, for each pixel data set, the plurality of color components into a set of converted pixel data, each converted pixel data set being defined by a luminance component and a color difference component;

determine whether or not each converted pixel data set has a black character attribute, each converted pixel data set that is determined to have the black character attribute being a set of target pixel data;

perform a filtering process on a luminance component of each target pixel data set using a first group of filter coefficients and perform the filtering process on the color difference component of the each target pixel data set using a second group of filter coefficients to obtain a set of processed pixel data, the processed pixel data set being defined by the luminance component and the color difference component, the first group of filter coefficients including an enhancement coefficient enhancing a difference in the luminance components between the each target pixel data set and a set of neighboring pixel data corresponding to the each target pixel data set, the second group of filter coefficients excluding any enhancement coefficients whose degrees of enhancements are greater than or equal to a degree of enhancement of the enhancement coefficient included in the first group of filter coefficients; and convert each processed pixel data set into a set of updated pixel data, the updated pixel data set being defined by the plurality of color components.

11. The image processing device according to claim 10, wherein the image processing circuit is further configured to:

determine whether or not each converted pixel data set is first pixel data, the first pixel data satisfying that a difference in the luminance components between the each converted pixel data set and a set of neighboring pixel data corresponding to the each converted pixel data set is greater than a predetermined value; and determine whether or not each converted pixel data set is second pixel data, the second pixel data representing black and satisfying: that the color difference component of the each converted pixel data set falls within an achromatic color range; and that the luminance component of the each converted pixel data set is smaller than or equal to a reference value;

wherein each converted pixel data set determined as both the first pixel data and the second pixel data is determined to have the black character attribute.

12. The image processing device according to claim 10, further comprising a storage device storing the first group of filter coefficients and the second group of filter coefficients.

13. The image processing device according to claim 12, wherein the image processing circuit is configured to determine that each converted pixel data set that is determined not to be the first pixel data or that is determined not to be the second pixel data does not have the black character attribute;

wherein the image processing circuit is further configured to perform, using a third group of filter coefficients, the filtering process on each of the plurality of color components of a set of pixel data to obtain first filtered pixel data, the set of pixel data being included in the first image and corresponding to each converted pixel data set that is determined not to have the black character attribute and that is determined as the first pixel data, the third group of filter coefficient including an enhancement coefficient;

wherein the image processing circuit is further configured to perform, using a fourth group of filter coefficients, the filtering process on the plurality of color components of a set of pixel data to obtain second filtered pixel data, the set of pixel data being included in the first image and corresponding to each converted pixel data set that is determined not to have the black character attribute and that is not determined as the first pixel data, the fourth group of filter coefficients excluding any enhancement coefficients whose degrees of enhancements are greater than or equal to a degree of enhancement of the enhancement coefficient included in the third group of filter coefficients.

14. The image processing device according to claim 13, wherein the image processing circuit is further configured to output second image data, the second image data including a plurality of sets of output pixel data corresponding to the plurality of sets of pixel data of the first image data, respectively, the image processing circuit being configured to output the second image data in a manner that:

when a set of converted pixel data is determined to have the black character attribute, the image processing circuit outputs, as a set of output pixel data, the updated pixel data set corresponding to the set of converted pixel data;

when a set of converted pixel data is determined not to have the black character attribute and determined to be the first pixel data, the image processing circuit outputs, as a set of output pixel data, the first filtered pixel data corresponding to the set of converted pixel data; and when a set of converted pixel data is determined not to have the black character attribute and not to be the first pixel data, the image processing circuit outputs, as a set of output pixel data, the second filtered pixel data corresponding to the set of converted pixel data.

15. The image processing device according to claim 14, wherein the first group of filter coefficients is the same as the third group of filter coefficients;

wherein the second group of filter coefficients is the same as the fourth group of filter coefficients.

16. The image processing device according to claim 13, wherein the first group of filter coefficients is the same as the third group of filter coefficients;

wherein the second group of filter coefficients is the same as the fourth group of filter coefficients.

17. The image processing device according to claim 10, wherein the image processing circuit is configured to convert, for each pixel data set, the plurality of color components into a set of YIQ color data, the set of YIQ color data including: a Y component representing luminance; and I and Q components representing color differences.

* * * * *